Aug. 8, 1939.　　　　M. B. SULLIVAN　　　　2,168,919
SEAT GUARD
Filed May 17, 1937

INVENTOR
Michael B. Sullivan
BY
Carl H. Crawford
ATTORNEY

Patented Aug. 8, 1939

2,168,919

UNITED STATES PATENT OFFICE 2,168,919

SEAT GUARD

Michael B. Sullivan, Spokane, Wash.

Application May 17, 1937, Serial No. 142,983

9 Claims. (Cl. 155—5)

The object of this invention is to provide a novel safety device for bus seats.

In my application filed May 7, 1937, Serial No. 141,313, which matured into Patent No. 2,154,540, on April 18, 1939, I disclosed a safety device that is particularly adapted to be attached to previously constructed seats, and it is one of the objects of this invention to provide a safety device that is especially adapted for incorporation into seats of this class when the latter are initially made, although this invention is not there limited.

It is a feature of this invention to provide a safety guard adapted to extend along any aisle exposed edge or end of a bus seat to prevent the occupant from sliding off from the end of the seat when the bus is making sharp turns, and in the present case I have devised a safety device or guard that can be located nearer the aisle end of the seat than the one in my previous application, whereby a greater extent of seat area is afforded the occupant.

My improved safety device preferably includes a guard portion and a seat end sustaining portion made from one piece or strip of flexible material than can be severed into the required lengths for seats of different depths.

While the safety device is made from a single strip of flexible material, such for instance as rubber, having a uniform moment of flexure, it is a feature to so proportion the parts that some thereof will have a greater degree of flexure than others.

It is a feature of this invention to provide a safety guard that is automatically tiltable or shiftable toward the occupant when the latter seats himself on the yielding bus seat, and to facilitate this tilting movement, the guard and sustaining portions are united or articulated by what I shall term a resilient hinged connection.

The invention has many other objects and features which will be more fully described in connection with the accompanying drawing and which will be more particularly pointed out in and by the appended claims.

In the drawing.

Like characters of reference designate similar parts throughout the different figures of the drawing.

Figure 1:
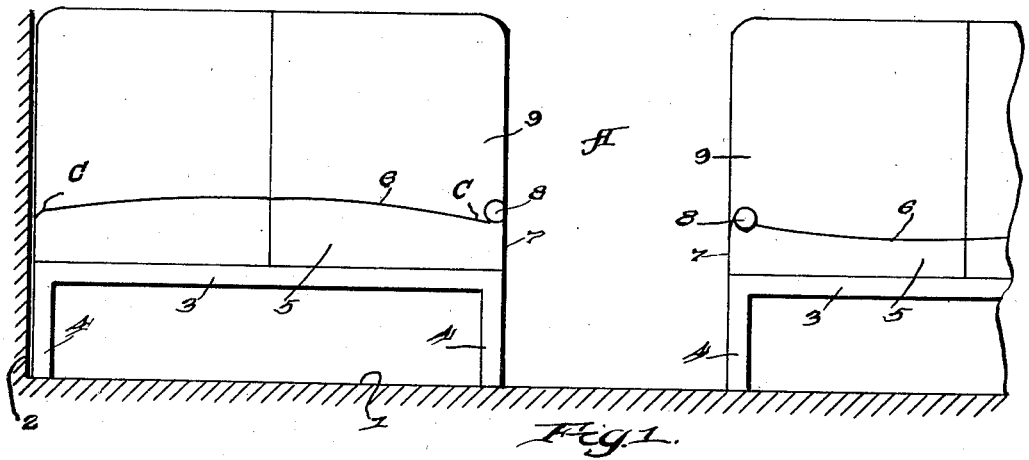
Fig. 1 is a transverse sectional view of a bus looking toward the rear and showing bus seats on opposite sides of an intervening aisle.

I have shown the general seat arrangement in Fig. 1, wherein the floor of the bus is indicated at 1, and one side of the bus at 2. The aisle is indicated at A, and on one side I have shown a seat for two occupants mounted on a frame 3 having legs 4. The front of the seat is indicated at 5, and the yielding seat top at 6. The aisle end of the seat is designated at 7 and my improved safety guard at 8, the latter being in the normal position because the seat is unoccupied. The back is shown at 9. The same reference numerals are applied to both seats but the seat top 6, at the right of the aisle, is shown depressed as it would be when occupied, and the guard 8 is shown tilted inwardly toward the occupant.

Reference will next be made to the specific construction of the safety device as herein shown, which is the preferred form thereof.

Figure 2:
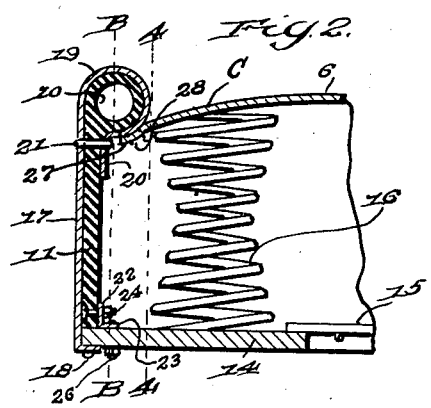
Fig. 2 is a sectional view on line 2—2 of Fig. 4, showing the normal position of the seat guard when the seat is not occupied.
Figure 5:
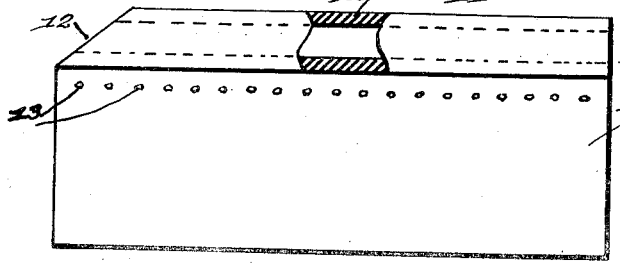
Fig. 5 is a view in side elevation of the safety device showing the same as an article of manufacture.

Said safety device, as shown in Figs. 2 and 5, is formed of a single piece or strip of flexible material, which may be rubber, and which is shaped to form a guard section indicated at 10, and a seat end sustaining section indicated at 11. The guard section 10 is tubular and preferably cylindrical in cross section and when it is desired to slope the front end, it is chamfered off as indicated at 12. The sustaining section 11 is in the form of a flange extending from the guard section at a tangent so that the major portion of the guard section will extend inwardly from said flange, as shown in Fig. 2. While I propose to mold or otherwise fabricate this safety device from a material having a uniform moment of flexure, I desire a greater degree of flexibility in some parts with respect to that of other parts.

It will be noted that the wall of guard 10 is of sufficiently reduced thickness with respect to the thickness of flange 11, so as to afford the guard a far greater degree of flexibility than said flange has, and in this connection it will be understood that with respect to the guard 10 I speak of flexibility in the sense of pliability or the capacity of the guard to collapse. However, when the guard collapses it will have ample resilience to recoil back to normal.

It is a feature of the invention, as will be later described, to provide a guard capable of tilting inwardly or, in other words, toward the far end of the seat and away from the aisle, and because the sustaining section 11 has less flexibility than the guard 10, I have devised a means of facilitating this shifting or tilting movement of the guard, which I shall next describe.

Near the junction of the guard 10 and flange 11, I appreciably reduce the stock of the latter sufficiently to relatively weaken the same, and in this form of the invention, I achieve this feature by providing a series of lacing holes or openings 13 in flange 11, so that to all intents and purposes I have provided a resilient hinge connection between said guard and flange, this being true irrespective of the fact that the two sections are formed in one integral piece of material. By this means it will be clear that the guard 10 is far more easily tilted into the Fig. 3 position, and at the same time the flange 11 retains its relatively greater rigidity in performing its function of yieldingly resisting depression of the aisle end of the seat, as will be later described. In addition, it will be clear that this flexible linear articulation or line of flexure can be located at precisely the place where it is desired that the guard should tilt from.

By making the safety device in the strip form shown, it can be cut to the desired lengths to fit various types and sizes of seats and the lower portion of flange 11 can also be reduced to accommodate seats of shallow height.

Reference will next be made to the manner in which the improved safety device is incorporated into a spring seat.

I have shown a spring seat of conventional form including a supporting frame 14 bordering the lower portion of the seat structure and spanned by the usual spring supporting grid 15. Coil springs 16 are interposed between the frame and the seat top 6. In accordance with the present disclosure the aisle end of the seat has a cover 17 extending abreast of the sustaining flange 11, the lower end being secured at 18 to the bottom of said frame 14. The upper portion 19 is extended about guard 10 to form a casing therefor and the end 20 is secured to flange 11 by leather or like lacing 21 that is inserted through the end 20, flange 11, and the outer portion 17 of said cover, as shown, the openings or holes 13 affording passage for the lacing 21, as will now be clear. Thus, the holes 13 perform the dual function of forming a line of greatest flexure and also accommodating the lacing 21. Further, by this means I insure a tight and smooth fit of the cover 19 about the guard 10. It will also be noted that the part 19 can be effectively closed over the sloping end 12 in a manner clearly within the skill of an upholsterer.

The lower edge of flange 11 rests upon frame 14, and I employ an angle iron strip having flanges 22 and 23 and extend a suitable bolt 24 through flange 22 and 11, the bolt having a shallow head 25 so that when the nut is tightened the head 25 will not wear the cover 17. A bolt 26, extending through frame 14 and flange 23, serves to anchor the parts and securely hold the flange 11 in place. The fastening means in the foregoing paragraph may constitute one way of mounting the flange 11 onto the seat frame, and will explain the term "mounted" in the claims.

Figure 3:
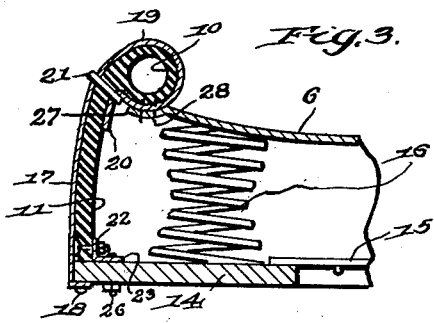
Fig. 3 is a view similar to Fig. 2, showing the position which the parts assume when a passenger has occupied the seat.
Figure 4:
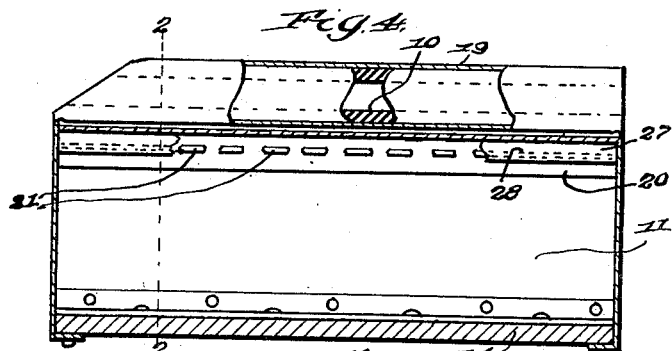
Fig. 4 is a longitudinal sectional view on line 4—4 of Fig. 2, looking toward the left of said figure.
Figure 6:
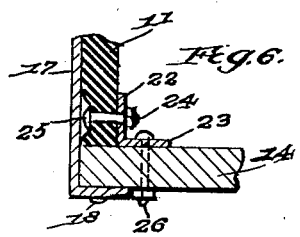
Fig. 6 is an enlarged sectional view showing the manner of anchoring the safety device to the seat frame.

It will now be clear that the cover 17 has an effective backing by reason of this novel location of guard 10 and flange 11, either when in an upright or bent over position, as shown in Figs. 2 and 3. This is important because leather wears rapidly if frequently moved and allowed to wrinkle or fold, but can withstand frequent movement if held taut by an effective backing.

I will next describe a novel means whereby depression of the seat top 6 will automatically tilt or shift the guard 10 from the Fig. 2 to the Fig. 3 position.

Such means as shown consists in stitching or otherwise securing the aisle end 27, of the seat top 6, to the casing 19 of guard 10, as indicated at 28. This connection, in practice, is completed before the casing 19 is laced to the flange 11. Now this novel connecting means does two things: it first disposes the aisle end of the seat top in a neat and conformable position with respect to the guard 10, and it provides an effective mechanical connection whereby an efficient pulling stress is instantly imposed on the guard 10 to tilt the same just as soon as the weight of an occupant is imposed upon the seat top 6.

By reason of the fact that the sustaining flange 11 junctures with the guard 10 at a tangent, I obtain two advantages, namely, the guard 10 is located immediately at the aisle end of the seat to permit a flush aisle end, and second, because the overhang of guard 10 is inwardly from the aisle, as vertical line B—B intersecting the longitudinal axis of guard 10 shows, it will thus be clear that the overhang is in the direction in which the guard is intended to tilt. If flange 11, junctured with guard 10, centrally thereof, this advantage would be lost.

Further, with this offset relation of the guard with respect to the sustaining flange, I am able to locate the latter outwardly toward the aisle, with respect to vertical line B—B and hence the aisle end portion of the seat is never depressed as much as that portion which sustains the weight of the occupant, and this action increases the extent of tilting movement of the guard, as will now be clear. At this point I desire to emphasize the importance of the maximum line of flexure or the resilient hinge formed by the series of lacing holes 13, which compensates for the relatively stiffer flange 11, as compared with the relatively more flexible guard 10, and permits, with the offset relation, a sharp and abrupt bend just at the location where it is required.

It is believed that the operation will be fully understood from the foregoing description, but I will briefly recapitulate the same.

With the seat unoccupied, the top 6 will bow upwardly substantially as shown and there will generally be a downward slant toward the aisle end, as indicated at C. This is much greater than the slant near the middle of the seat, as will be clear by reference to Fig. 1. The resiliency of the safety device, together with the spring supported position of the aisle end 27, of seat top 6, will support the safety device in the Fig. 2 position, and because guard 10 is located immediately at the aisle end of the seat, a relatively greater area of the latter is available, and still there is no overhang of the guard into the aisle.

When an occupant seats himself and depresses seat top 6, as shown in Fig. 3, the seat top is tensioned and by reason of the means connecting it with the guard, the latter is shifted or tilted inwardly away from the aisle and toward the person of the occupant sitting on the aisle portion of the seat, thereby effectively acting to prevent the occupant from sliding off the aisle end of the seat. It will be understood that these bus seats are most usually of leather and very slick, and without some effective means of prevention, passengers frequently slide off into the aisle when a bus makes a sharp turn, thereby causing injuries and damage claims.

It will be seen from Fig. 3, that the guard is not only tilted inwardly, but because of the relatively stiffer sustaining member 11, the guard 10 is also at a much higher elevation than the seat top. Therefore it will be clear that the sustaining member 11 functions to permit the guard 10 not only to tilt inwardly, but because said member 11 itself flexes, the guard 10 is permitted to move downwardly as well to fully compensate for the shortening of the seat top, due to its depression.

Suppose a passenger lost his balance and suddenly seated himself accidentally on top of guard 10 instead of on the seat inside of said guard, then, and in that event the guard 10 would collapsibly yield, and if the weight were sufficient, the sustaining member 11 would also flex, and hence the passenger would not even suffer a flesh bruise.

While the device of this invention is primarily adapted to function as a safety device for the aisle exposed end of a bus seat, it is equally adapted for any aisle exposed edge of a bus seat where a safety factor is important. Therefore, whenever I have referred to the aisle end of the seat, I consider this to mean and include any aisle exposed edge of a bus seat.

It is believed the invention will be fully understood from the foregoing description and while I have herein shown and described one specific form thereof, I do not wish to be limited thereto except for such limitations as the claims may impart.

I claim:

1. In an aisle end safety device for transversely disposed bus seats, the combination with a bus seat having a yielding seat top and an aisle end including a cover therefor and a supporting frame, of a flexible safety guard having a tubular guard portion extending along the aisle end of said seat and a supporting flange portion disposed inside said cover and having a lower edge resting on and being secured to said frame and adapted to resist depression of the aisle end of said seat, the wall of said guard portion being reduced with respect to the thickness of said flange portion to increase flexibility of the former with respect to the latter, and said flange portion having a line of lacing openings adjacent said guard portion to increase flexibility with respect to the remainder of said flange portion and render said guard portion more easily tiltable, the upper portion of said end cover extending about said guard portion to form a casing therefor and being laced to said flange portion through said openings, and said seat top having its aisle end secured to said casing, whereby depression of said seat top will shift said guard portion toward the occupant and buckle said flange portion transversely of its length.

2. In an aisle end safety device for transversely disposed bus seats, the combination with a bus seat having a yielding seat top and an aisle end including a cover therefor and a supporting frame, of a flexible safety guard having a tubular guard portion extending along the aisle end of said seat and a supporting flange portion disposed inside said cover and the lower end of said flange portion being secured to said frame and adapted to resist depression of the aisle end of said seat, said flange portion having a line of lacing openings adjacent said guard portion to render the latter more easily tiltable, the upper portion of said end cover extending about said guard portion to form a casing therefor and being laced to said flange portion through said openings, and said seat top having its aisle end secured to said casing, whereby depression of said seat top will tilt said guard portion toward the occupant and stress or flex said flange portion dependent upon the weight of the occupant.

3. In an aisle end safety device for transversely disposed bus seats, the combination with a bus seat having a yielding seat top and an aisle end including a cover therefor and a supporting frame, of a flexible safety guard having a guard portion extending along the aisle end of said seat and a supporting flange portion secured to said frame and adapted to resist depression of the aisle end of said seat, the upper portion of said end cover extending about and forming a casing for said guard portion, and said seat top having its aisle end connected with said casing, whereby depression of said seat top will tilt said guard portion toward the occupant while said flange portion resists depression of the aisle end of said seat.

4. In an aisle end safety device for bus seats, a passenger seat including a seat frame therefor, a yielding seat top, and a flexible guard extending along the aisle end of said seat and connected with said seat top, said flexible guard having a supporting flange formed integral therewith and mounted in the aisle end of said seat in contact with a portion of said seat frame for resisting depression of the aisle end of said seat as depression of the latter tilts said guard toward the occupant.

5. In an aisle end safety device for bus seats, a passenger seat including a seat frame therefor, a yielding seat top, a flexible guard extending along the aisle end of said seat, said guard having a supporting flange mounted in the aisle end of said seat in contact with a portion of said seat frame for resisting depression of the aisle end of said seat, and means actuated by the weight of an occupant of the seat and engaging said guard to tilt the latter toward the occupant when the seat is occupied.

6. In an aisle end safety device for bus seats, a passenger seat including a seat frame therefor, and an integral safety device comprising a yielding guard portion extending along the aisle end of said seat and a flexible seat end supporting flange portion mounted inside of the aisle end of said seat in contact with a portion of said seat frame.

7. In an aisle end safety device for bus seats, a passenger seat provided with an integral yielding safety device comprising a guard portion extending along the aisle end of said seat and a seat end supporting flange portion mounted in the aisle end of said seat, and means actuated by the weight of an occupant of the seat and engaging said guard to tilt the latter toward the occupant when the seat is occupied.

8. In an aisle end safety device for bus seats, a passenger seat provided with a yielding safety device comprising a guard portion extending along the aisle end of said seat and a seat end supporting flange portion mounted in the aisle end of said seat and adapted to resist depression, said guard and flange portions being resiliently hinged to each other to facilitate tilting movement of said guard portion, and means actuated by the weight of an occupant of the seat and engaging said guard to tilt the latter toward the occupant when the seat is occupied.

9. In an aisle edge safety device for bus seats, a passenger seat including a frame therefor, a yielding safety device for said seat comprising a hollow guard extending along the aisle exposed edge of said seat and having a sheet-like supporting flange mounted in said aisle exposed edge of said seat in contact with a portion of said frame and said flange being in sufficient offset relation to said guard whereby the aisle face of said safety device will be entirely flush and said guard will project in the direction in which it is to be tilted, and means actuated by the weight of an occupant of the seat and engaging said guard to tilt the latter toward the occupant when the seat is occupied.

MICHAEL B. SULLIVAN.